(12) United States Patent
Chaturvedi et al.

(10) Patent No.: US 7,149,535 B1
(45) Date of Patent: Dec. 12, 2006

(54) METHOD AND SYSTEM FOR INITIATING MOBILE STATION RE-PAGING AT AN INTERVAL BASED ON PAGING SLOT CYCLE

(75) Inventors: Pawan Chaturvedi, Overland Park, KS (US); Tong Zhou, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 466 days.

(21) Appl. No.: 10/757,057

(22) Filed: Jan. 14, 2004

(51) Int. Cl.
*H04Q 7/20* (2006.01)
*H04B 7/00* (2006.01)

(52) U.S. Cl. .................. 455/458; 455/435.1; 455/567; 455/434; 455/524; 455/432.1; 370/278; 370/442; 370/458; 370/329; 370/328; 370/465

(58) Field of Classification Search ................ 455/458, 455/435.1, 567, 434, 524, 432.1; 370/278, 370/442, 458, 329, 328, 465
See application file for complete search history.

(56) References Cited

U.S. PATENT DOCUMENTS

| | | | | |
|---|---|---|---|---|
| 6,307,846 B1 * | 10/2001 | Willey | ......................... | 370/329 |
| 6,687,285 B1 * | 2/2004 | Jou | ............................. | 375/133 |
| 6,823,192 B1 * | 11/2004 | Jou et al. | ..................... | 455/458 |
| 7,020,477 B1 * | 3/2006 | Cramby et al. | ............. | 455/458 |
| 2005/0090270 A1 * | 4/2005 | Jou et al. | ..................... | 455/458 |

* cited by examiner

*Primary Examiner*—Jean Gelin
*Assistant Examiner*—Julio Perez

(57) ABSTRACT

A method and system for initiating re-paging of a mobile station at an interval that is a function of the mobile station's paging slot cycle. A radio access network will select a time interval based on a mobile station's slot cycle index and will conclude that a page attempt has failed if the radio access network does not receive a page response from the mobile station by the expiration of the time interval after paging the mobile station. Upon expiration of the time interval, the radio access network will then re-page the mobile station at a next timeslot commensurate with the slot cycle index being used for paging the mobile station.

17 Claims, 6 Drawing Sheets

(slot cycle index = 2)

(slot cycle index = 0)

(slot cycle index = 2)

(slot cycle index = 0)

METHOD AND SYSTEM FOR INITIATING MOBILE STATION RE-PAGING AT AN INTERVAL BASED ON PAGING SLOT CYCLE

BACKGROUND

1. Field of the Invention

The present invention relates to telecommunications and, more particularly, to paging of wireless devices such as cellular telephones for instance.

2. Description of Related Art a. Paging Slot Cycles

In a cellular communication system, an air interface paging channel may be divided into a number of timeslots in which a base station can transmit a page message to a mobile station. In order to conserve mobile station battery power, each mobile station will typically be arranged to operate at a given "slot cycle index" (SCI), which defines the frequency at which the mobile station will wake up and check the paging channel for a page. For instance, under cdma2000, a mobile station operating at slot cycle index 0 (zero) would wake up and check for a page every 1.28 seconds, whereas a mobile station operating at slot cycle index 2 would wake up and check for a page every 5.12 seconds.

When a mobile station first registers with a cellular serving system, the mobile station and the serving system will negotiate for use of a given slot cycle index. Thereafter, the serving system will then page the mobile station on a timeslot that the mobile station is set to check. For instance, if a mobile station is operating at slot cycle index 0, then the base station will page the mobile station in a timeslot that is some multiple of 1.28 seconds from time t=0, whereas if the mobile station is operating at slot cycle index 2, then the base station will page the mobile station in a timeslot that is some multiple of 5.12 seconds from time t=0.

Generally speaking, the more often a mobile station wakes up to check the paging channel for a page, the more quickly the mobile station's battery will drain. Therefore, it is generally desirable for a mobile station to operate at a relatively slow (or infrequent) slot cycle, such as at slot cycle index 2 for instance. Slot cycle index 2 is generally adequate to support paging for incoming telephone calls.

However, in some instances, it makes sense for a mobile station to operate at a faster slot cycle, such as slot cycle 0. By way of example, if a mobile station is operating in a push-to-talk (PTT) mode, in which another user might seek to establish "instant" communication with the mobile station, it would be best for the mobile station to operate at a faster slot cycle, so as to reduce latency in setting up such a communication.

In practice, most of the mobile stations operating in a wireless carrier's system will be set to a relatively slow slot cycle, such as slot cycle index 2, since most of the mobile stations will be engaging in normal telephone calls rather than PTT-type communication. However, some mobile stations in the carrier's system might be set to a relatively fast slot cycle, such as slot cycle index 0, in order to most usefully engage in PTT-type communication.

b. Re-Paging after Failure

When a mobile station receives a page, it will conventionally respond to the serving system with a page response message. However, in some cases, the serving system will not receive the page response, which would mean that a failure of some sort occurred in paging the mobile station. The failure could result from the mobile station being temporarily out of coverage or for some other reason. When that happens, the serving system may try re-paging the mobile station.

A serving system will wait to receive a page response for a given time interval after paging a mobile station, and if the serving system does not receive a page response from the mobile station by the expiration of that time interval, the serving system will then conclude that paging failed and will re-page the mobile station on the next timeslot that the mobile station is set to monitor. For purposes of this description, the time interval that the serving system waits before deciding that paging has failed may be referred to as a "failure-interval."

In existing cellular communication systems, a serving system will apply a fixed failure-interval between a first and second page attempt for any mobile station operating in the system, regardless of the slot cycle index at which the mobile station is operating. Generally, the carrier would use a fixed failure interval that is believed to be long enough to allow a typical condition giving rise to a paging failure to go away. (For instance, the interval might be long enough that, if the mobile station had temporarily moved out of coverage, the mobile station is likely to have moved back into coverage by the time the interval expires.) Further, the interval would preferably be long enough to avoid unnecessarily increasing congestion on the paging channel (by paging too often).

By way of example, a carrier might use a fixed failure-interval of 6 seconds. Thus, if the mobile station operates at slot cycle index 0 and the serving system pages the mobile station at time t=0 and receives no response by time t=6, then the serving system would re-page the mobile station on the next possible slot, i.e., the slot that occurs at time t=6.4 (that is, 5×1.28). On the other hand, if the mobile station operates at slot cycle index 2 and the serving system pages the mobile at time t=0 and receives no response by time t=6, then the serving system would re-page the mobile station on the next possible slot, i.e., the slot that occurs at time t=10.24 (that is, 2×5.12).

SUMMARY

The inventors have discovered that using a fixed failure-interval gives rise to an inefficient use of resources. To understand the inefficiency, consider the following design constraints:

(1) Desire to Generally Maximize the Failure-Interval

As noted above, it makes sense to wait as long as possible between page attempts, in order to maximize the chance that the failure condition will be mitigated by the time of a re-page, and in order to avoid increasing congestion on the paging channel.

(2) Desire to Minimize the Failure-Interval when Operating at a Faster Slot Cycle It also makes sense to minimize the failure interval for mobile stations that are engaged in an application that benefits from use of a faster slot cycle. For instance, for a mobile station that is set to engage in PTT-type communication and is therefore operating at a faster slot cycle, it would make sense to re-page the mobile station more quickly.

Clearly, these constraints are at odds. For instance, if the fixed failure-interval is set very long in view of constraint #1, then the failure-interval would likely exceed constraint #2 for mobile stations operating at a fast slot cycle. On the other hand, if the fixed failure-interval is set very short in view of constraint #2, then the failure-interval would likely violate constraint #1.

To account for these two design constraints, the present invention provides for varying the failure-interval as a function of the slot cycle index used by the mobile station being paged. For instance, a serving system may use a smaller failure-interval when a mobile station is operating at a faster slot cycle (e.g., slot cycle index 0) and a larger failure-interval when a mobile station that is operating at a slower slot cycle (e.g., slot cycle index 2).

By way of example, for a mobile station operating at slot cycle index 0, the serving system may be arranged to use a failure-interval of 2, whereas for a mobile station operating at slot cycle index 2, the serving system may be arranged to use a failure-interval of 9. Thus, if a mobile station operates at slot cycle index 0 and the serving system pages the mobile station at time t=0 and receives no response by time t=2, then the serving system would re-page the mobile station on the next possible slot, i.e., the slot that occurs at time t=2.56 (that is 2×1.28). On the other hand, if the mobile station operates at slot cycle index 2 and the serving system pages the mobile at time t=0 and receives no response by time t=9, then the serving system would re-page the mobile station on the next possible slot, i.e., the slot that occurs at time t=10.24 (that is, 2×5.12).

Note that it is known today for a carrier to select its fixed failure-interval based on the slot cycles that its subscribers are set to use. That is, when designing a cellular system, a carrier may opt to have a higher fixed failure-interval if at least some of its subscribers will be operating at a higher slot cycle index, whereas the carrier may opt to use a shorter failure-interval if none (or few) of its subscribers will be operating at a high slot cycle index. However, setting a fixed failure-interval across the board differs from selecting a failure interval based on the slot cycle index at which the given mobile station is currently operating—such that the system would apply different failure-intervals for mobile stations operating at different slot cycle indexes.

BRIEF DESCRIPTION OF THE DRAWINGS

An exemplary embodiment of the present invention is described below with reference to the accompanying drawings in which.

DETAILED DESCRIPTION OF AN EXEMPLARY EMBODIMENT

1. Wireless Communication System

Figure 1:
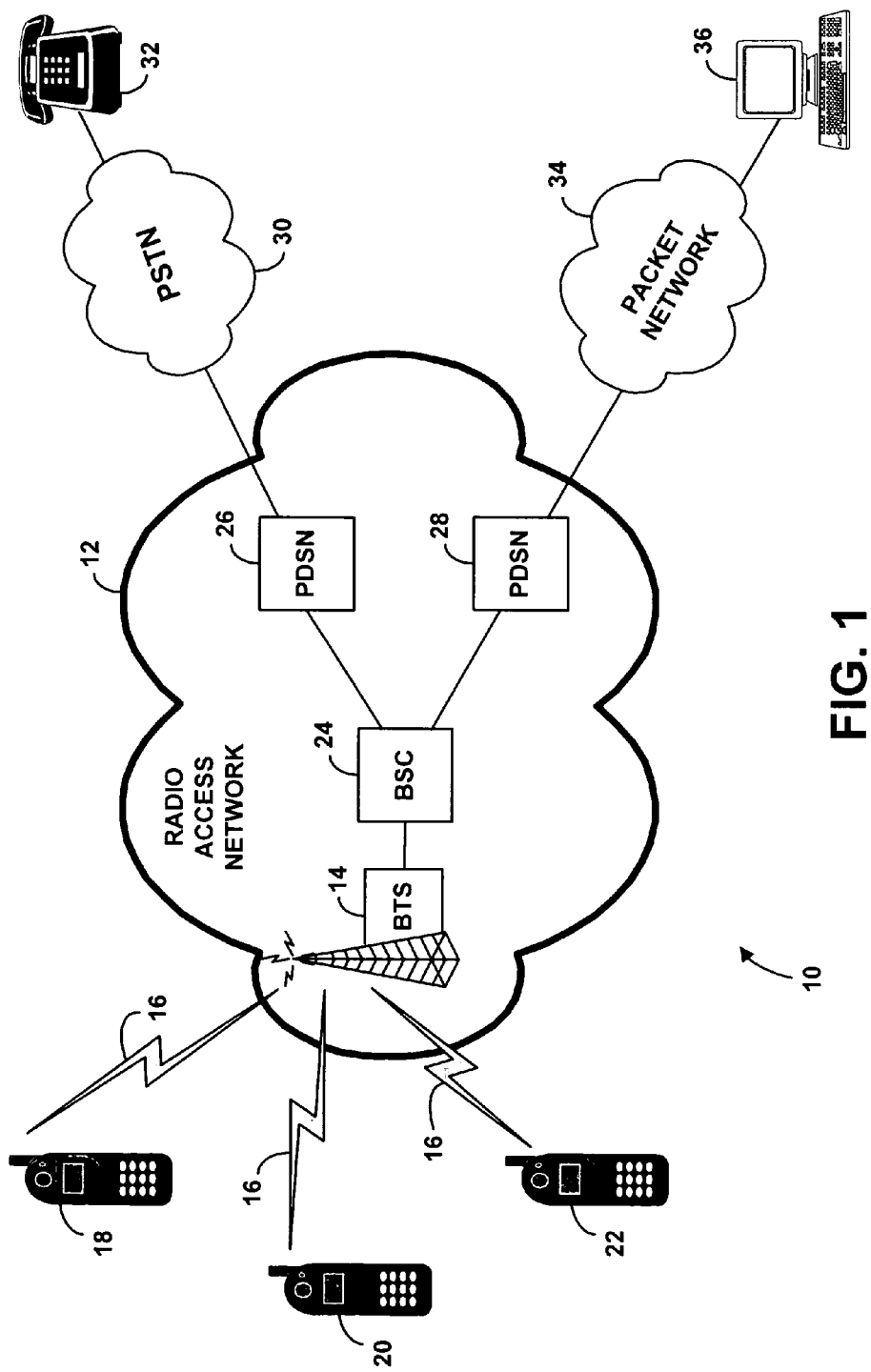
FIG. 1 is a block diagram of an exemplary wireless communication system in which the exemplary embodiment can be implemented.

Referring to the drawings, FIG. 1 is a simplified block diagram of an exemplary wireless communication system 10 in which the present invention can be implemented. It should be understood, however, that this and other arrangements and processes described herein are set forth for purposes of example only, and other arrangements and elements (e.g., machines, interfaces, functions, orders of elements, etc.) can be added or used instead and some elements may be omitted altogether. Further, as in most telecommunications applications, those skilled in the art will appreciate that many of the elements described herein are functional entities that may be implemented as discrete components or in conjunction with other components, in any suitable combination and location.

Exemplary system 10 includes at its core a radio access network (RAN) 12, which provides connectivity between one or more mobile stations and one or more transport networks. RAN 12 includes a base transceiver station (BTS) 14 (e.g., a Motorola SC4812, SC611, SC614 or SC4850) that radiates to produce an air interface coverage area 16 in which mobile stations can operate. FIG. 1 depicts three mobile stations (shown as cellular telephones) 18, 20, 22, for instance, which are positioned in coverage area 16. In turn, the BTS 14 is coupled with a base station controller (BSC) 24 (e.g., a Nortel BSS or a Motorola CBSC), which is then coupled with a mobile switching center (MSC) 26 (e.g., a Lucent 5ESS) and a packet data serving node (PDSN) 28 (e.g., a Nortel Shasta 5000 or a UTStarcom Total Control 1000). The MSC 26 provides connectivity with the public switched telephone network (PSTN) 30, which may connect with a remote telephone device 32. And the PDSN 28 provides connectivity with a packet-switched network 34, which may connect with a remote computer 36.

With this arrangement, a mobile station can be arranged to communicate with remote telephone device 32 through a communication path comprising air interface 16, BTS 14, BSC 24, MSC 26 and PSTN 28. Further, a mobile station can be arranged to communicate with remote computer 36 through a communication path comprising air interface 16, BTS 14, BSC 24, PDSN 28 and packet-switched network 34.

Note that many variations on the system of FIG. 1 are possible. For example, although the figure shows only one BTS, one BSC, one MSC and one PDSN, system 10 could include multiples of these entities. That is, an MSC and/or PDSN could serve one or more BSCs, each BSC could serve one or more BTSs, and each BTS could radiate to provide one or more coverage areas. As another example, the functional components of RAN 12 could be combined together in various ways. For instance, BTS 14 and BSC 24 could be combined together, and/or BSC 24 and MSC 26 could be combined together. As still another example, one or more of the functional components shown in the figure could be omitted altogether.

And as yet another example, although each mobile station is shown in FIG. 1 as a cellular telephone, RAN 12 could equally serve other sorts of mobile stations as well, such as wirelessly-equipped personal digital assistants (PDAs), or wirelessly-equipped personal computers, for instance. Further, note that "mobile station" is a term of art that can encompass any wireless communication device, regardless of whether the device is easily movable (e.g. portable) or is located in a fixed position.

In the exemplary embodiment, when a mobile station powers on or otherwise enters the coverage area of RAN 12, the mobile station may first register with the RAN. To do so, the mobile station may send a registration message over an air interface access channel to the RAN, providing the RAN with an identification of the mobile station, such as a mobile identification number (MIN) and/or electronic serial number (ESN) and other information. The RAN may then authenticate and authorize the mobile station. Further, the RAN may obtain a copy of the mobile station's service profile from a home location register (not shown) and store the profile in a visitor location register (not shown) for later reference.

Once the mobile station is registered, the mobile station may then originate outgoing communications via the RAN and receive incoming communications via the RAN. For instance, the mobile station may place a call via PSTN 30 to remote telephone 32, and the mobile station may receive a call via PSTN 30 from remote telephone 32. Further, the mobile station may acquire an IP address for communication on packet-switched network 34 and use that IP address to exchange packet-data with remote computer 36.

To originate a call over the PSTN, the mobile station may send an origination message over an air interface access channel to the RAN, providing dialed digits indicative of the called party. In the exemplary embodiment, the origination message will pass to the MSC 26, and the MSC will responsively set up the call over the PSTN to the called party. Further, the MSC 26 will instruct the BSC 24 to assign an air interface traffic channel for use by the mobile station, and the BSC 24 will do so.

On the other hand, when a call for the mobile station comes in to the RAN from the PSTN, the RAN will page the mobile station over an air interface paging channel, so as to alert the mobile station of the incoming call. For instance, the MSC 26 may receive a call request from the PSTN and may responsively direct the BSC 24 to page the mobile station, and the BSC may responsively send a page message over the paging channel for receipt by the mobile station. An exemplary page message may carry an identifier of the mobile station, such a MIN, so that the mobile station can determine that the page message is for the mobile station. Further, the page message could direct the mobile station to use a particular air interface traffic channel when answering the call. The page message could take various other forms as well.

Upon receipt of the page message, the mobile station may then answer the call (e.g., when a user presses a "TALK" button) by sending a page response to the RAN. The page response can take various forms. Upon receipt of the page response message, the RAN would then connect the call through over the assigned traffic channel to the mobile station.

To engage in packet-data communication, on the other hand, the mobile station would first acquire both a radio link (i.e., traffic channel) via air interface 16 and a data link via PDSN 28. To do this, the mobile station may send an origination message to the RAN, including in the origination message a packet-data service option code. Upon receipt of the origination message bearing that service option code, the MSC may then instruct the BSC to process the origination, and the BSC may responsively assign a traffic channel for use by the mobile station and may signal to the PDSN 28 to facilitate setup of packet-data connectivity. The PDSN 28 and mobile station may then negotiate to establish a data link layer connection, such as a point-to-point protocol (PPP) session for instance, and the PDSN or other network entity may assign an IP address for the mobile station to use on packet-switched network 34.

Once the mobile station acquires packet-data connectivity, the mobile station may then send and receive packet-data via the PDSN 28 and the packet-switched network 34. For instance, the mobile station may exchange packet-data with computer 36.

When a mobile station has a radio link and a data link, the mobile station is considered to be in an "active" state. After a certain period of time during which no packet-data flows to or from the mobile station, however, the BSC 24 may release the traffic channel that had been assigned to the mobile station, which would put the mobile station in a "dormant" state. In the dormant state, the mobile station would lack a radio link, but it would still have a data link. Thus, the mobile station may still seek to send packet-data to other entities on the packet-switched network, and other entities on the packet-switched network may still seek to send packet-data to the IP address of the mobile station.

In the dormant state, if the mobile station seeks to send packet-data, the mobile station would first send an origination message to the RAN, and the BSC would responsively assign a traffic channel for use by the mobile station, thereby putting the mobile station in the active state. The mobile station may then send the packet-data over that traffic channel and via the RAN onto the packet-switched network.

Similarly, when the mobile station is in the dormant state, if another entity on the packet-switched network 34 seeks to send packet-data to the IP address of the mobile station, the packet-data would arrive at the PDSN 28 and flow to the BSC 24. Because the mobile station would lack a radio link over which the BSC could send the incoming packet-data, the BSC would then page the mobile station, and the mobile station would send a page response to the RAN. Thus, the BSC would assign a traffic channel for use by the mobile station, and the BSC would send the packet-data to the mobile station over that traffic channel.

2. Paging

Figure 2:
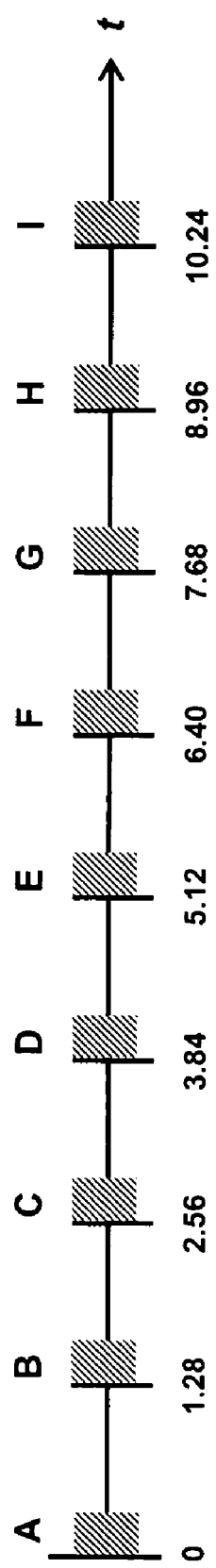
FIG. 2 is a timing chart showing example paging channel timeslots.

As noted above, the air interface paging channel may be divided into timeslots, and mobile stations that are currently idle will wake up and listen for messages on the paging channel during their assigned timeslots as indicated by an applicable slot cycle index. FIG. 2 is a time chart depicting where these timeslots may fall in an exemplary paging channel beginning at time t=0. (A sync channel message or other mechanism could be used to synchronize clocks at the mobile station and RAN for this purpose). As shown in FIG. 2, timeslots may occur every 1.28 seconds and may last for a defined period of time (as indicated by the shading in the figure) such as 20 milliseconds. By way of example, FIG. 2 depicts nine such timeslots, labeled A–I. Timeslot A occurs at time t=0 seconds, timeslot B occurs at time t=1.28 seconds, timeslot C occurs at time t=2.56 seconds, timeslot D occurs at time 3.84 seconds, and so forth. Timeslots on the paging channel will normally continue in this manner beyond the nine illustrated.

Under cdma2000, a slot cycle index of 0 would provide for paging a mobile station on a timeslot that occurs at any multiple of 1.28 seconds from time t=0, i.e., on any of the timeslots shown. On the other hand, a slot cycle index of 2 would provide for paging a mobile station on a timeslot that occurs at any multiple of 5.12 seconds from time t=0, such as slot D or slot H for instance. (Note that other slot cycle indexes may exist as well. For instance, a slot cycle index of 1 may provide for paging a mobile station on a timeslot that occurs at any multiple of 2.56 seconds from time t=0, such as slot B, D, F or H for instance.) Of course, the timeslots shown in FIG. 2 are only examples; a paging channel could be structured with timeslots other than those shown.

A mobile station and the RAN will agree in advance to use a particular slot cycle index for paging the mobile station. Conventionally, the chosen slot cycle may be governed by two settings. One is a "preferred slot cycle index" that may be set in the mobile station through service provisioning. And the other is a "maximum slot cycle index" that may be set in the RAN and broadcast to the mobile station in overhead control channel messages. To agree on a slot cycle index to use, the mobile station may notify the RAN of the mobile station's preferred slot cycle index (e.g., in a registration message or other access channel message), and the mobile station may receive the maximum slot cycle index broadcast by the RAN. In a typical arrangement, both the mobile station and the RAN will then select the lower of the two numbers to use for paging the mobile station.

For example, if the mobile station's preferred slot cycle index is 0 and the RAN's maximum slot cycle index is 2, then the mobile station and RAN will use a slot cycle index of 0. Thus, if slot cycle index 0 corresponds to a period of 1.28 seconds, then the mobile station will wake up and check the paging channel every 1.28 seconds, and when the RAN needs to page the mobile station the RAN will do so in a timeslot that occurs at a multiple of 1.28 seconds from time t=0.

As another example, if the mobile station's preferred slot cycle index is 2 and the RAN's maximum slot cycle index is 2 as well, then the mobile station and RAN will use a slot cycle index of 2. Thus, if slot cycle index 2 corresponds to a period of 5.12 seconds, then the mobile station will wake up and check the paging channel every 5.12 seconds, and when the RAN needs to page the mobile station the RAN will do so in the time slot that occurs at a multiple of 5.12 seconds from time t=0.

Normally, a mobile station and RAN will agree on a slot cycle index during registration of the mobile station. However, in accordance with the exemplary embodiment, the mobile station may change its slot cycle at some point during operation in the serving area of the RAN. For instance, if the mobile station switches from a normal "voice call" mode to a PTT mode, the mobile station may benefit from use of a lower slot cycle index. Thus, the mobile station might change its preferred slot cycle index from 2 to 0 and may send an access channel message (e.g., a new registration message or another agreed message) to the RAN, notifying the RAN of the new preferred slot cycle index. In this scenario, the next time the RAN pages the mobile station, the RAN would do so using slot cycle index 0.

Generally, when a mobile station receives a page message (i.e., page) from the RAN, the mobile station will respond to the page message by sending to the RAN a page response, which can take various forms. For instance, if the RAN is attempting to connect a PSTN call to the mobile station and thus pages the mobile station, the mobile station may indicate willingness to take the call by sending a page response to the RAN. Similarly, if the RAN is attempting to send packet-data to a dormant mobile station and thus pages the mobile station, the mobile station may indicate willingness to receive the packet-data by sending a page response to the RAN.

Figure 3:
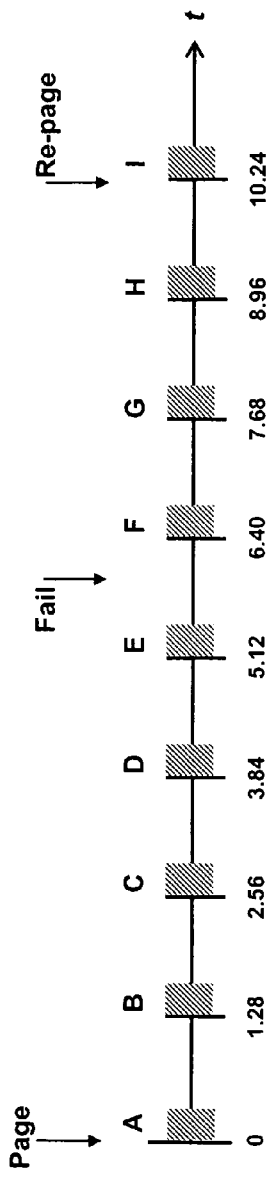
FIGS. 3 and 4 are timing charts showing the result of using a fixed failure-interval when paging mobile stations.
Figure 4:
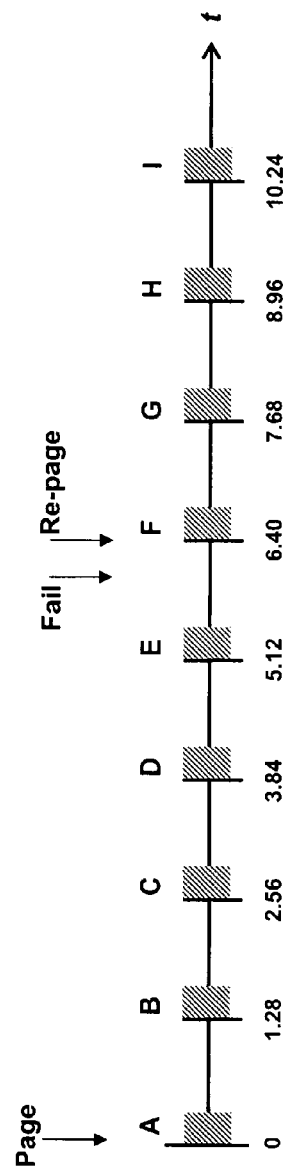

As further noted above, if the RAN does not receive a page response within a defined period of time (failure-interval), the RAN would conclude that the page failed and would re-page the mobile station on the next timeslot that the mobile station is set to monitor. In the existing art, the failure-interval used by a carrier is a fixed-interval regardless of what slot cycle index a given mobile is using. For instance, although some of a carrier's subscribers may have a slot cycle index of 0 and others may have a slot cycle index of 2, the carrier may employ a fixed failure-interval of 6 seconds for all mobile stations. FIGS. 3 and 4 illustrate the impact of doing so.

FIG. 3 assumes a mobile station is operating with a slot cycle index of 2, and FIG. 4 assumes that a mobile station is operating with a slot cycle index of 0. Both figures assume that the RAN first pages the mobile station at time t=0 (as indicated by the "Page" label) and that the RAN then waits until time t=6 to determine that the mobile station has not responded to the page (as indicated by the "Fail" designation). In FIG. 3, once the RAN makes this determination at time t=6, the RAN would then re-page the mobile station at the next timeslot for slot cycle index 2, which would be slot I (t=10.24) (as indicated by the "Re-page" designation). In FIG. 4, on the other hand, once the RAN makes this determination at time t=6, the RAN would then re-page the mobile station at the next timeslot for slot cycle 0, which would be slot F (t=6.40).

The present invention improves over this arrangement by instead having the RAN use a failure-interval that is a function of the slot cycle index used by the mobile station being paged. In the exemplary embodiment, the RAN will use a smaller failure-interval when paging a mobile station that is operating at a smaller slot cycle index, and the RAN will use a larger failure-interval when paging a mobile station that is operating at a larger slot cycle index. However, the failure-interval could be functionally related to the slot cycle index in some other way as well.

To accomplish this, the RAN may be equipped with data or other logic that correlates each slot cycle index with a respective failure interval, such that the failure interval is smaller for smaller slot cycle indexes and larger for larger slot cycle indexes. For instance, the RAN may be equipped with a table such as the following:

| Slot Cycle Index | Failure-Interval |
|---|---|
| 0 | 2 |
| 1 | 5 |
| 2 | 9 |

With this example table, (i) if the slot cycle index being used for paging a given mobile station is 0, the RAN would use a failure interval of 2, (ii) if the slot cycle index being used for paging a given mobile station is 1, the RAN would use a failure interval of 5, and (iii) if the slot cycle index being used for paging a given mobile station is 2, the RAN would use a failure interval of 9.

(Note that in this example, each failure interval is just slightly less than two times the slot cycle frequency. For instance, for slot cycle index 0 with a frequency of 1.28 seconds, the failure interval is 2 seconds, which is just slightly less than 2.56. And for slot cycle index 2 with a frequency of 5.12 seconds, the failure interval is 9, which is just slightly less than 10.24.)

It should of course be understood, however, that these specific correlations and values are just examples, and others are possible as well. Further, it should be understood that the RAN may consider additional factors as well when determining what failure-interval to use when paging a given mobile station.

Figure 5:
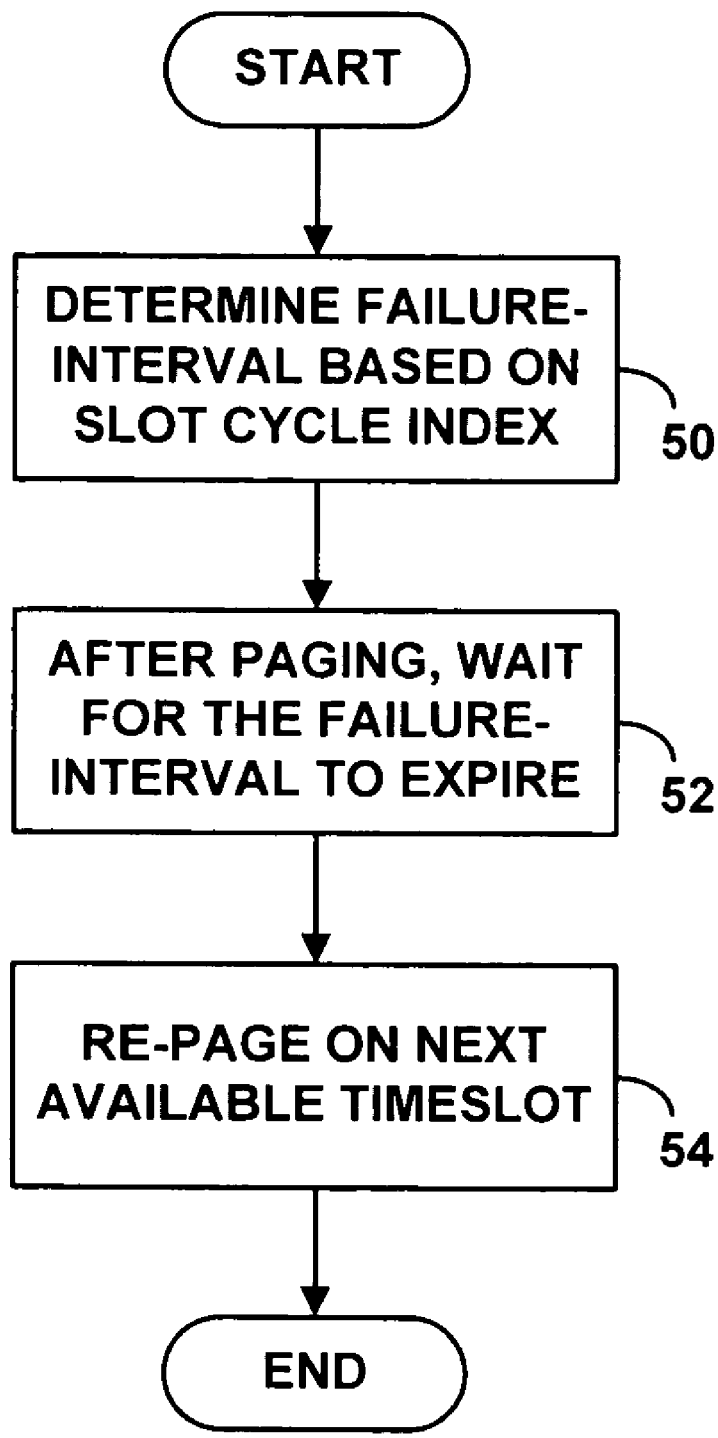
FIG. 5 is a flow chart depicting operation of the exemplary embodiment.

FIG. 5 provides a flow chart depicting how the RAN would use correlation logic like this in practice. As noted above, the orders of functions can vary from that shown and described. As shown in FIG. 5, at block 50, when the RAN is to page a mobile station operating at a given slot cycle index, the RAN will apply the correlation logic to determine a failure-interval based on the slot cycle index. At block 65, after paging the mobile station, the RAN will then wait for the failure-interval to expire. Upon expiration of the failure-interval, the RAN will then re-page the mobile station.

Figure 6:
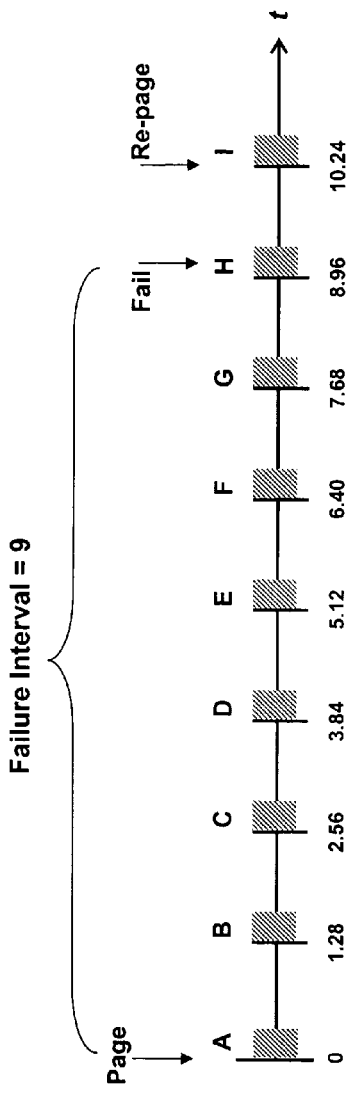
FIGS. 6 and 7 are timing charts showing the result of selecting failure-intervals based on slot cycle index, in accordance with the exemplary embodiment.
Figure 7:
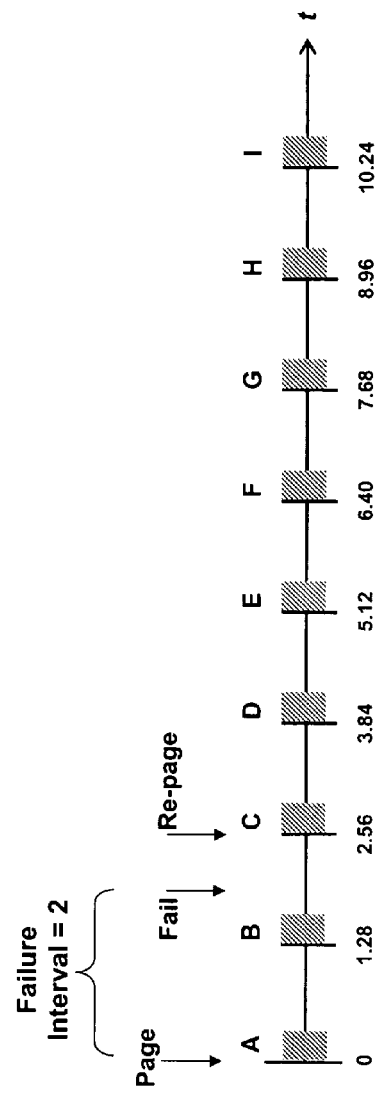

The RAN can carry out this process each time the RAN pages a mobile station. Alternatively, the RAN can carry out this process each time the RAN agrees to use a particular slot cycle for a given mobile station, and the RAN can record the selected failure-interval for use when subsequently paging the mobile station. The end result is that the RAN will use different failure-intervals when paging mobile stations with different slot cycle indexes. FIGS. 6 and 7 illustrate this result.

FIG. 6 first assumes a mobile station is operating with a slot cycle index of 2. Thus, referring to the example correlation data shown above, the RAN would select a failure-interval of 9. Consequently, after first paging the mobile station at time t=0, the RAN would wait for the failure interval to expire at time t=9. The RAN would then re-page the mobile station at the next timeslot for slot cycle index 2, which would be slot I (t=10.24).

FIG. 7 then assumes a mobile station is operating with a slot cycle index of 0. Thus, referring to the example correlation data shown above, the RAN would select a failure-interval of 2. Consequently, after first paging the mobile station at time t=0, the RAN would wait for the failure interval to expire at time t=2. The RAN would then re-page the mobile station at the next timeslot for slot cycle index 0, which would be slot C (t=2.56).

Advantageously, with this arrangement, the RAN can have a smaller failure interval for mobile stations is operating at a smaller slot cycle index. This can be particularly beneficial in a system where mobile stations that are sensitive to latency (delay in session setup) operate at smaller slot cycle indexes than mobile stations that are not so sensitive to latency. In that scenario, because the latency-sensitive mobile stations would be operating at a smaller slot cycle index, the RAN could apply a shorter failure interval for them as well, which could help further reduce latency.

3. Exemplary Logic Architecture

In accordance with the exemplary embodiment, one or more component(s) of the RAN could carry out the function of dynamically selecting a failure-interval based on the slot cycle index of the mobile station being paged. Which component(s) carry out the function can depend on which component(s) decide to page and re-page a mobile station. Further, the decision could be made in some instances by one component and in other instances by another component, if appropriate.

For instance, if the MSC is the RAN entity that decides when to re-page a mobile station, then it might make sense for the MSC to select a failure-interval to use for that mobile station. Or if the BSC is the entity that decides when to re-page a mobile station, then it may make sense for the BSC to select a suitable failure-interval to use for that mobile station. Still alternatively, some other entity could select a failure-interval to use for a given mobile station and could report the selected failure-interval to the MSC, the BSC or some other RAN entity, or to a data file accessible by a RAN entity.

As noted above, the slot cycle index used for paging a given mobile station will usually be selected when the mobile station registers in the RAN, and so the RAN can refer to that dynamically selected slot cycle index when deciding what failure-interval to use. However, as an alternative, the slot cycle index for paging a given mobile station could be set in advance for the mobile station. For instance the mobile station service profile stored in the home location register and visitor location register could specify the slot cycle index to be used for paging the mobile station. Thus, the MSC could refer to the slot cycle index indicated by that service profile when deciding which failure-interval to use for the mobile station.

Figure 8:
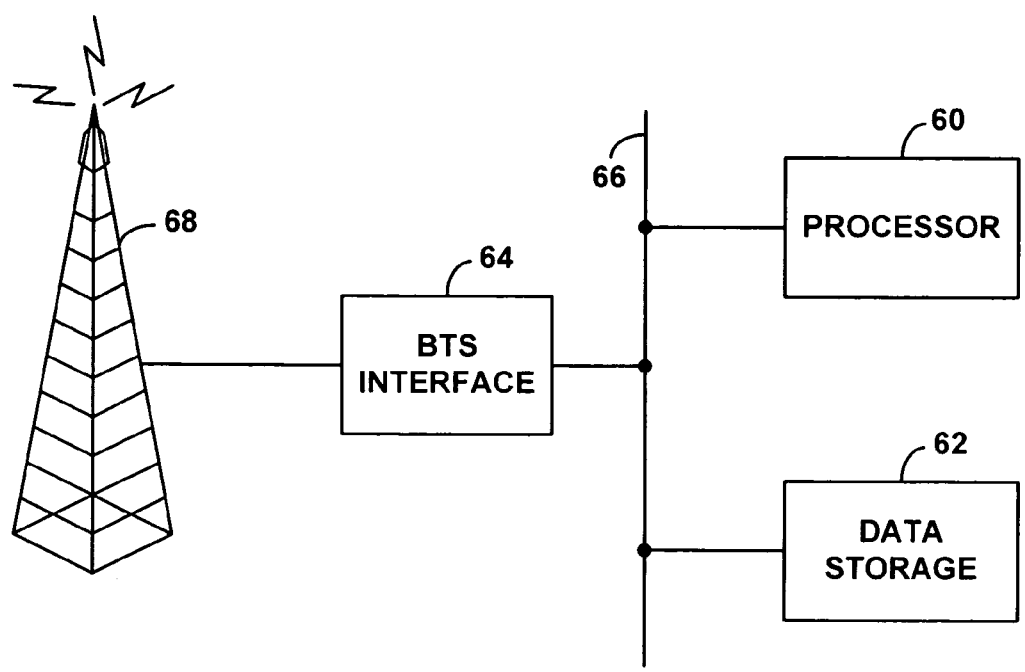
FIG. 8 is a block diagram showing logical components arranged to carry out the exemplary embodiment.

FIG. 8 is a functional block diagram depicting logical RAN components arranged to carry out the exemplary embodiment. These logical components could reside in a BSC and/or MSC for instance. As shown, the components include a processor 60, data storage 62, and a BTS interface 64, which may be coupled together by a bus, network or other link 66. Processor 60 may be one or more general purpose or specialized processors. And data storage 62 may be volatile and/or non-volatile memory or other storage. BTS interface 64 then couples with a BTS that radiates to communicate with mobile stations such as those shown in FIG. 1.

In the exemplary embodiment, data storage 62 holds machine language instructions that are executable by processor 60 to carry out various functions described herein. For example, the instructions may define logic for the processor 60 to receive from a mobile station via BTS interface 64 an indication of the mobile station's preferred slot cycle index, and to then decide which slot cycle index to use by comparing the preferred slot cycle index to the maximum slot cycle index. Further, the instructions may define logic for the processor 60 to generate and send a page message via BTS interface 64 to the mobile station, and to receive a page response from the mobile station.

Still further, the instructions may define logic for the processor 60 to select a failure-interval to use when paging a mobile station, based on a slot cycle index being used for paging the mobile station. In this regard, the data storage may also hold correlation data such as that described above, or some variation of that correlation data, to facilitate selection of a failure-interval based on slot cycle index.

Note that the functions of the exemplary embodiment can alternatively be carried out by hardware, or any combination of hardware, firmware and/or software.

4. Conclusion

An exemplary embodiment of the present invention has been described above. Those skilled in the art will understand, however, that changes and modifications may be made to this embodiment without departing from the true scope and spirit of the present invention, which is defined by the claims.

What is claimed is:

1. A radio access network comprising:

at least one antenna structure for sending and receiving signals over at least one radio frequency air interface in communication with mobile stations operating in a coverage area of a base station;

paging logic for sending page messages to mobile stations via the antenna structure, wherein, for a given mobile station, the paging logic is arranged (i) to send a page message to the given mobile station on a paging channel slot that the given mobile station is set to monitor, (ii) to wait up to a time interval for a response from the given mobile station and, (iii) absent receipt of a response from the given mobile station by expiration of the time interval, to re-page the given mobile station on a next paging channel time slot that the given mobile station is set to monitor; and interval-selection logic for selecting the time interval based on a paging slot cycle index of the given mobile station.

2. The radio access network of claim 1, wherein:
the interval-selection logic is arranged to select a first time interval if the given mobile station is operating at a first slot cycle index; and
the interval-selection logic is arranged to select a second time interval shorter than the first time interval if the given mobile station is operating at a second slot cycle index smaller than the first slot cycle index.

3. The radio access network of claim 1, further comprising a base station controller, wherein the base station controller applies the paging logic and the interval-selection logic.

4. The radio access network of claim 1, further comprising a mobile switching center, wherein the mobile switching center applies the paging logic and the interval-selection logic.

5. The radio access network of claim 1, wherein the interval-selection logic operates dynamically to select the time interval when the radio access network is paging the given mobile station.

6. The radio access network of claim 1, wherein the interval-selection logic operates to select the time interval for the given mobile station after a determination is made of what slot cycle index will be used for paging the given mobile station.

7. The radio access network of claim 2, wherein:
the first slot cycle index is 2 and the second slot cycle is 0.

8. The radio access network of claim 1, further comprising:
a processor;
data storage; and
machine language instructions stored in the data storage and executable by the processor, the machine language instructions defining the paging logic and the interval-selection logic.

9. The radio access network of claim 1, wherein the given mobile station is a cellular telephone.

10. A method comprising:
using a slot cycle index of a mobile station as a basis to select a failure-interval to use for re-paging the mobile station; and
using the selected failure-interval as a basis to determine when to re-page the mobile station.

11. The method of claim 10, wherein using the slot cycle index of the mobile station as a basis to select a failure-interval to use for re-paging the mobile station comprises:
if the slot cycle index is a first slot cycle index, selecting a first failure-interval; and
if the slot cycle index is a second slot cycle index smaller than the first slot cycle index, selecting a second failure-interval shorter than the first failure-interval.

12. The method of claim 11, wherein the first slot cycle index is 2 and the second slot cycle index is 0.

13. The method of claim 10, wherein using the selected failure-interval as a basis to determine when to re-page the mobile station comprises:
waiting for expiration of the failure-interval; and
upon expiration of the failure-interval, re-paging the mobile station at a next timeslot commensurate with the slot cycle index of the mobile station.

14. A method comprising:
receiving a signal indicative of an incoming communication for a first mobile station;
determining a first slot cycle index under which the first mobile station operates;
paging the first mobile station on a paging channel slot commensurate with the first slot cycle index;
waiting a first interval to receive a page response from the first mobile station, and making a first determination, upon expiration of the first interval, that a page failure has occurred;
responsive to the first determination, re-paging the first mobile station on a next paging channel slot commensurate with the first slot cycle index;
receiving a signal indicative of an incoming communication for a second mobile station;
determining a second slot cycle index under which the second mobile station operates, wherein the second slot cycle is different than the first slot cycle index;
paging the second mobile station on a paging channel slot commensurate with the second slot cycle index;
waiting a second interval to receive a page response from the second mobile station, and making a second determination, upon expiration of the second interval, that a page failure has occurred, wherein the second interval is different than the first interval; and
responsive to the second determination, re-paging the second mobile station on a next paging channel slot commensurate with the second slot cycle index.

15. The method of claim 14, further comprising:
selecting the first interval based on the first slot cycle index; and
selecting the second interval based on the second slot cycle index.

16. The method of claim 15, further comprising:
selecting the first interval when paging the first mobile station; and
selecting the second interval when paging the second mobile station.

17. The method of claim 15, wherein:
the first slot cycle index is smaller than the second slot cycle index; and
the first interval is shorter than the second interval.

* * * * *